(12) United States Patent
Okamoto

(10) Patent No.: US 7,973,830 B2
(45) Date of Patent: Jul. 5, 2011

(54) IMAGING APPARATUS AND EXPOSURE CONTROL METHOD

(75) Inventor: Satoshi Okamoto, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 371 days.

(21) Appl. No.: 12/161,918

(22) PCT Filed: Mar. 7, 2007

(86) PCT No.: PCT/JP2007/055018
§ 371 (c)(1),
(2), (4) Date: Jul. 23, 2008

(87) PCT Pub. No.: WO2007/105745
PCT Pub. Date: Sep. 20, 2007

(65) Prior Publication Data
US 2009/0009649 A1 Jan. 8, 2009

(30) Foreign Application Priority Data

Mar. 9, 2006 (JP) ................................. 2006-064577

(51) Int. Cl.
H04N 5/235 (2006.01)
(52) U.S. Cl. ................. 348/229.1; 348/221.1; 348/222.1
(58) Field of Classification Search ................. 348/229.1
See application file for complete search history.

(56) References Cited

U.S. PATENT DOCUMENTS

| | | | |
|---|---|---|---|
| 5,987,261 A | 11/1999 | Sugahara et al. | |
| 6,122,447 A * | 9/2000 | Washisu | 396/55 |
| 6,167,202 A * | 12/2000 | Fukui | 396/157 |
| 6,636,263 B2 | 10/2003 | Oda | |
| 7,218,353 B2 * | 5/2007 | Wakabayashi | 348/362 |
| 7,456,868 B2 * | 11/2008 | Calderwood | 348/229.1 |
| 2002/0018142 A1 | 2/2002 | Oda | |
| 2003/0081140 A1 | 5/2003 | Furukawa | |
| 2003/0146986 A1 * | 8/2003 | Calderwood | 348/240.1 |

(Continued)

FOREIGN PATENT DOCUMENTS

JP 06-121225 A 4/1994

(Continued)

OTHER PUBLICATIONS

EP Communication, dated Jan. 27, 2010, issued in corresponding EP Application No. 07738489.9, 6 pages in English.

*Primary Examiner* — Jason Chan
*Assistant Examiner* — Cynthia Calderon
(74) *Attorney, Agent, or Firm* — Sughrue Mion, PLLC

(57) ABSTRACT

In a digital camera (10), an imaging sensitivity setting circuit (61) selects a pair of distance range selection parameters "A" and "B" according to a zoom position of a zoom lens (41), to compare an in-focus position of a focusing lens (43) with these parameters "A" and "B", wherein the parameters "A" and "B" correspond to a farther distance and a nearer distance respectively. If the in-focus position is farther than the parameter "A", the imaging sensitivity is set to a high level. If the in-focus position is in between these parameters "A" and "B", the imaging sensitivity is set to a middle level. If the in-focus position is nearer than the parameter "B", the imaging sensitivity is set to a low level. Based on the set imaging sensitivity level and a measured subject brightness value, a system controller (41) controls the exposure value and the flashlight volume.

9 Claims, 16 Drawing Sheets

U.S. PATENT DOCUMENTS

| | | | |
|---|---|---|---|
| 2004/0085459 A1* | 5/2004 | Hoshuyama et al. | 348/223.1 |
| 2005/0001912 A1* | 1/2005 | Hoshuyama | 348/272 |
| 2005/0074181 A1* | 4/2005 | Hoshuyama | 382/266 |
| 2005/0088538 A1* | 4/2005 | Nozaki et al. | 348/229.1 |
| 2005/0157206 A1 | 7/2005 | Kato | |
| 2005/0185082 A1* | 8/2005 | Lee et al. | 348/345 |
| 2005/0265014 A1 | 12/2005 | Matsui et al. | |
| 2008/0095431 A1* | 4/2008 | Ishiga | 382/167 |

FOREIGN PATENT DOCUMENTS

| | | |
|---|---|---|
| JP | 09-061910 A | 3/1997 |
| JP | 11-084489 A | 3/1999 |
| JP | 2000-134533 A | 5/2000 |
| JP | 2001-358988 A | 12/2001 |
| JP | 2005-204120 A | 7/2005 |
| JP | 2005-284166 A | 10/2005 |

* cited by examiner

FIG.13 i=0                                                   7

| 1 | 1  | 1  | 1  | 1  | 1  | 1  | 1 |
|---|----|----|----|----|----|----|---|
| 1 | 4  | 4  | 4  | 4  | 4  | 4  | 1 |
| 1 | 16 | 32 | 32 | 32 | 32 | 16 | 1 |
| 1 | 16 | 32 | 64 | 64 | 32 | 16 | 1 |
| 1 | 16 | 32 | 64 | 64 | 32 | 16 | 1 |
| 1 | 16 | 32 | 32 | 32 | 32 | 16 | 1 |
| 1 | 4  | 4  | 4  | 4  | 4  | 4  | 1 |
| 1 | 1  | 1  | 1  | 1  | 1  | 1  | 1 |

56                                                  63 it has been different to control the flashlight volume properly. This is because the flashlight reaching range depends not only upon the object distance but also upon the f-number of the lens. The third prior art, as requiring making several preliminary light emissions, takes a long time for one shooting operation.

IMAGING APPARATUS AND EXPOSURE CONTROL METHOD

TECHNICAL FIELD

The present invention relates to an imaging apparatus provided with a vari-focal taking lens, a solid state imaging device that takes an electronic image out of an optical image of a subject formed through the taking lens, and a flash device. The present invention also relates to an exposure control method for such an imaging apparatus.

BACKGROUND ART

Digital cameras have recently been wide spread, which are imaging apparatuses that takes image data through a solid state imaging device like a CCD image sensor, and records it. The digital cameras are provided with a flash device to project a flashlight toward a subject at the exposure when brightness of the subject is in a low level.

If, however, the subject is so distant that the flashlight cannot reach it, the subsequent image will be under-exposed. To solve this problem, a digital camera has been known for example from Japanese Laid-open Patent Application No. Hei 06-121225, wherein the image signal outputted from the solid state imaging device is amplified with a gain that is changed according to the object distance, to compensate for a shortage of exposure amount.

Also a digital camera has been known for example from Japanese Laid-open Patent Application No. 2000-134533, wherein an imaging sensitivity and a light control value, which is a reference value for stopping emission of the flashlight, are decided based on the object distance on making a flash shot. The digital camera of this prior art extends the range of object distance, within which the volume of flashlight is automatically controllable.

In a digital camera as disclosed for example in Japanese Laid-open Patent Application No. Hei 11-084489, several times of preliminary exposures are made with a corresponding number of preliminary light emissions at a constant light volume, and respective image signals obtained by the preliminary exposures are amplified with different gains from each other. A flashlight volume for a main or final exposure is decided based on the amplified image signals, while checking if any of the amplified image signals are within a predetermined signal level range.

However, since the digital cameras as disclosed in the above-mentioned first and second prior arts decide the imaging sensitivity and the light control value of the flash device merely based on the object distance, it has been different to control the flashlight volume properly. This is because the flashlight reaching range depends not only upon the object distance but also upon the f-number of the lens. The third prior art, as requiring making several preliminary light emissions, takes a long time for one shooting operation.

In view of the foregoing problems, an object of the present invention is to provide an imaging apparatus that can make the shooting operation promptly with a proper flashlight volume to obtain a properly exposed image. Another object of the present invention is to provide an exposure control method for such an imaging apparatus.

DISCLOSURE OF INVENTION

In order to achieve the above objects, an imaging apparatus of the present invention, which is provided with a taking lens having a zoom lens and a focusing lens, a solid state imaging device for taking image signal from an optical image of a subject formed through the taking lens, and a flash device for emitting a flashlight to the subject, comprises a photometry device for measuring a brightness value of the subject, a zoom position detecting device for detecting a zoom position of the zoom lens, an in-focus position detecting device for detecting an in-focus position of the focusing lens, an imaging sensitivity setting device for setting an imaging sensitivity based on the detected zoom position and the detected in-focus position, a control device for controlling an exposure value and the volume of the flashlight from the flash device based on the measured subject brightness value and the set imaging sensitivity, and a first amplification device for amplifying the imaging signal as being outputted from the solid state imaging device with a gain corresponding to the set imaging sensitivity.

Preferably, the imaging apparatus of the present invention further comprises an A/D converter that converts the image signal into digital image data, and the in-focus position detecting device comprises an integration device that extracts high-frequency components from the image data obtained at different positions of the focusing lens, and integrates the high-frequency components to obtain an integration value at each of the different positions of the focusing lens, and a judging device that detects the position of the focusing lens at which the integration value becomes the largest, to judge it to be the in-focus position.

Preferably, the imaging apparatus of the present invention further comprises a gain shortage calculation device for calculating a gain shortage value by calculating a luminance value of the image data and comparing the calculated luminance value with a predetermined expected luminance value, and a second amplification device for amplifying signal level of the image data based on the calculated gain shortage value.

The imaging sensitivity setting device preferably sets a plural number of imaging sensitivity levels, and the control device sets different exposure values corresponding to the respective imaging sensitivity levels, to make a corresponding number of successive shots at the respective combinations of the imaging sensitivity levels and the exposure values. In that case, the imaging apparatus further comprises a display device for displaying images based on the image data, wherein the control device controls the display device to display an image selection screen that allows selecting at least one of images obtained by the successive shots.

Preferably, the imaging apparatus further comprises a setting value selection device that selects setting values for various kinds of signal processing on the image data according to the set imaging sensitivity, and a signal processing device for processing the image data based on the selected setting values for the various kinds of signal processing. The setting values include parameters designating gradation conversion characteristics for use in a gradation conversion process of the image data, parameters designating a range of correction amounts for use in an edge enhancement process of the image data, and parameters designating a filtering threshold value for use in a noise reduction process of the image data.

According to the present invention, an exposure control method for an imaging apparatus comprising a taking lens having a zoom lens and a focusing lens, a solid state imaging device for taking image signal from an optical image of a subject formed through the taking lens, and a flash device for emitting a flashlight to the subject, the method comprising steps of measuring a brightness value of the subject, detecting a zoom position of the zoom lens, detecting an in-focus position of the focusing lens, setting an imaging sensitivity based on the detected zoom position and the detected in-focus position, controlling an exposure value and the volume of the flashlight from the flash device based on the measured subject brightness value and the set imaging sensitivity, and amplifying the imaging signal as being outputted from the solid state imaging device with a gain corresponding to the set imaging sensitivity.

According to the present invention, the imaging sensitivity is set at a level decided based on the zoom position of the zoom lens and the in-focus position of the focusing lens, and the exposure value and the flashlight volume are controlled based on the set imaging sensitivity. Therefore, even while the f-number varies with the focal length of the taking lens, the exposure value and the flashlight volume are controlled properly, preventing such inadequacy that the flashlight is too weak to reach a main subject in a far range, or that the flashlight causes bleaching of a main subject in a near range. Since it is unnecessary to make several times of preliminary flashing, the shooting is speeded.

As the second amplification device compensates for a gain shortage of the image data, the image quality is improved. Making successive shots at different imaging sensitivity levels and exposure values that are decided corresponding to these sensitivity levels allows providing an image that fits the photographer's intension better.

Image quality is still more improved by making various kinds of signal processing of the image data based on the setting values which are predetermined according to the imaging sensitivity.

BRIEF DESCRIPTION OF DRAWINGS

FIG. 13 is an explanatory diagram illustrating respective weighting coefficients for divisional photometric areas;

BEST MODE FOR CARRYING OUT THE INVENTION

Figure 1:
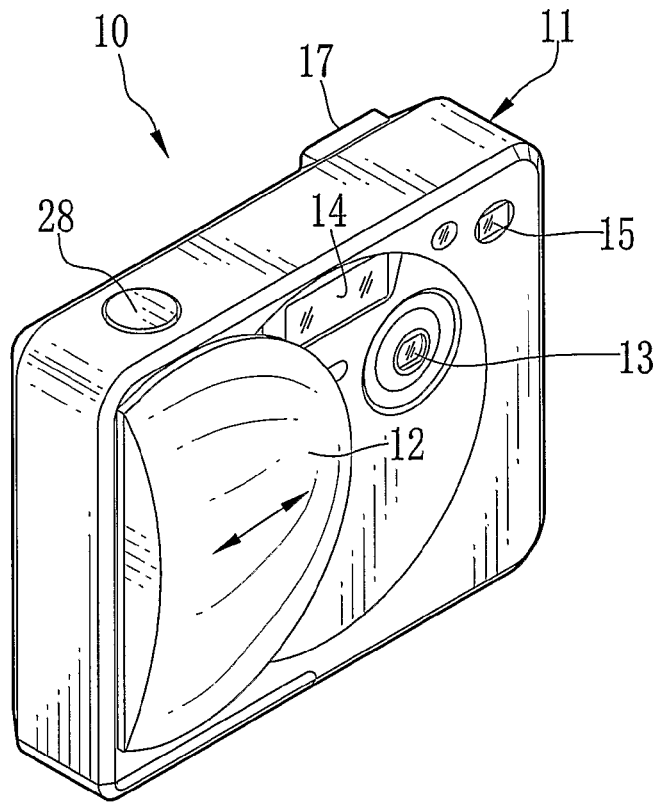
FIG. 1 is a front perspective view of a digital camera.

FIG. 1 shows a digital camera 10 as an imaging apparatus, which is provided with a sliding lens barrier 12 on a front of a camera body 11. By sliding the lens barrier 12 to an open position as shown in FIG. 1, a taking lens 13 and a flash projector 14 are uncovered. Also a finder objective window 15 of an optical viewfinder is disposed on the front of the camera body 11.

The lens barrier 12 doubles as a power switch operating member, so a power source in the camera body 11 is turned ON when the lens barrier 12 is slid to the open position. When the lens barrier 12 is slid to a closed position to cover up the taking lens 13 and the flash projector 14, the power source is turned OFF.

Figure 2:
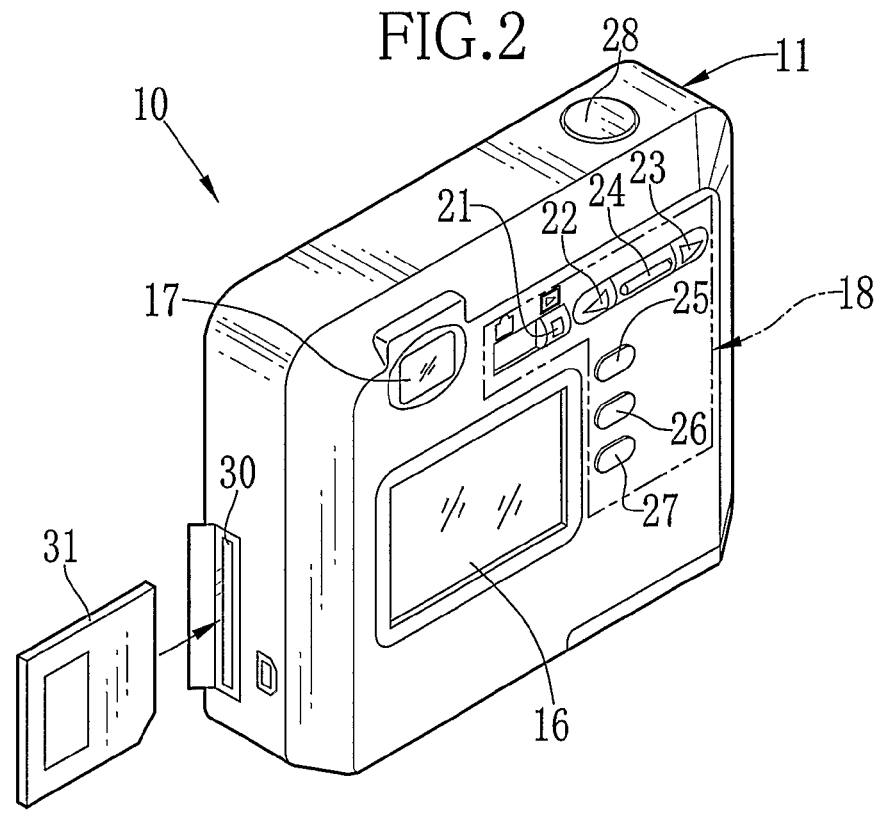
FIG. 2 is a rear perspective view of the digital camera.

As shown in FIG. 2, on a rear side of the camera body 11 are provided an LCD 16 as an image display device, a finder ocular window 17 of the optical viewfinder, and an operating section consisting of several operating members. The LCD 16 displays camera-through images, reproduced images, a menu screen and various setup screens.

The operating section 18 consists of a mode switching button 21, a return button 22, a forward button 23, a zoom button 24, a menu button 25, a cancel button 26 and a display button 27.

The mode switching button 21 is slid to switch over between a shooting mode and a reproduction mode. The return button 22 and the forward button 23 are pressed to shift the reproduced image back and forth in the reproduction mode. The zoom button 24 is pushed up and down to change the focal distance of the taking lens 13. These buttons 22, 23 and 24 are also used as cursor buttons for moving a cursor on the screen of the LCD 16.

The menu button 25 is pressed to display the menu screen for choosing a setup menu on the LCD 16. The cancel button 26 is pressed to interrupt setup operations on the setup screens, or to return to the previous screen. The display button 27 is pressed to turn the LCD 16 ON or OFF.

A shutter button 28 is provided on a top side of the camera body 11. The shutter button 28 is pressed down in two steps. When the shutter button 28 is pressed halfway, the digital camera 10 executes various preparatory processes for shooting. When the shutter button 28 is pressed further to the full, an imaging process is executed.

On one side of the camera body 11 is formed a recording media slot 30. A recording medium 31 for storing image data is removably inserted into the recording media slot 30.

Figure 3:
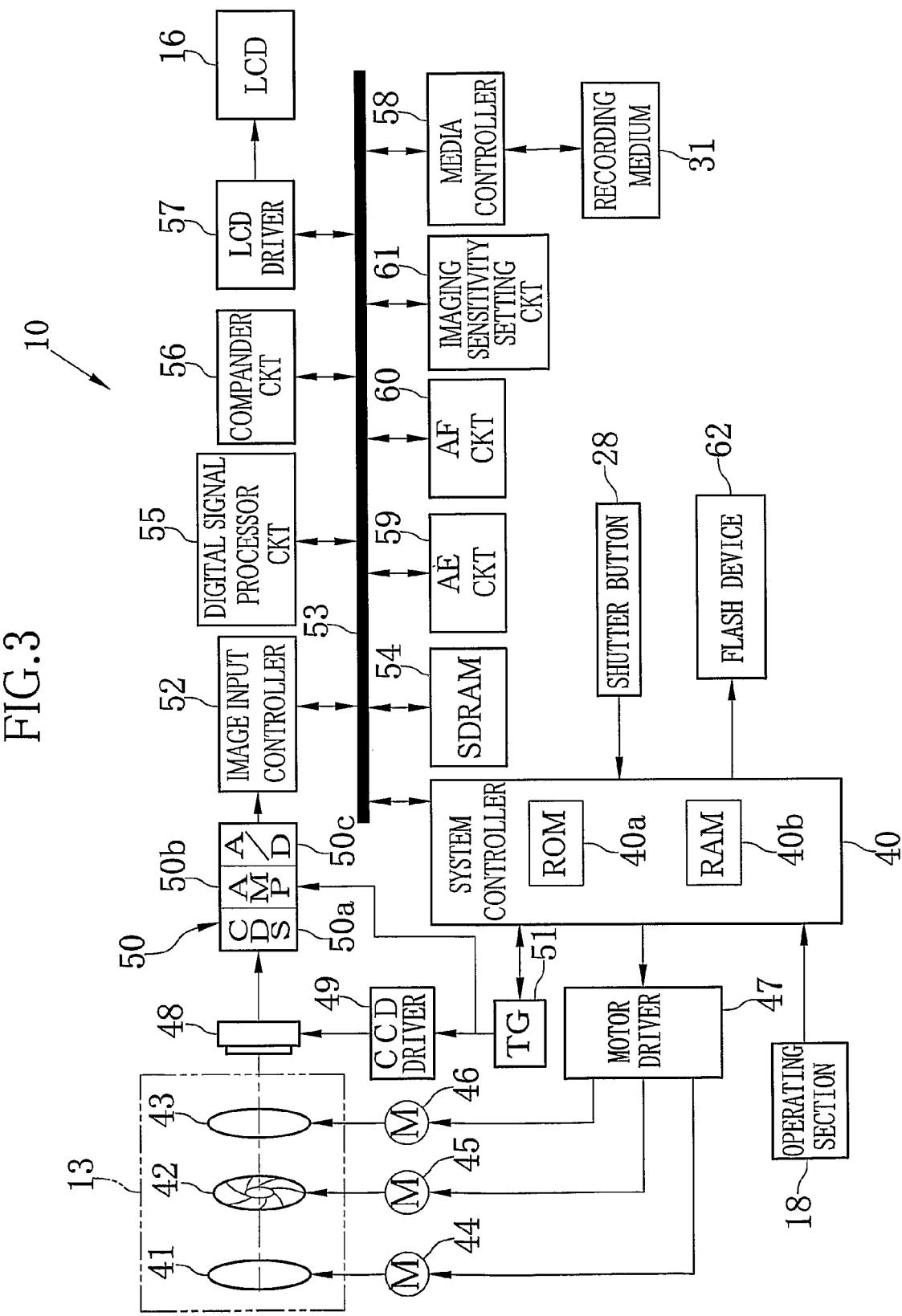
FIG. 3 is a block diagram illustrating the circuitry of the digital camera according to a first embodiment.

Now the circuitry of the digital camera 10 will be described with reference to FIG. 3. Respective components of the digital camera 10 are controlled by a system controller 40. The system controller 4l is provided with a ROM 40a and a RAM 40b.

The ROM 40a stores control programs and control data for controlling the respective components built in the camera body 11. The system controller 40 controls the respective components according to the control programs and control data. The RAM 40b is a work memory for storing various data temporarily during various operations.

As being connected to the operating section 18 and the shutter button 28, the system controller 40 also controls the components based on operational signals entered through the operating section 18 and the shutter button 28.

The taking lens 13 is a vari-focal lens that can change its focal length, and is composed of a zoom lens 41, a stop 42 and a focusing lens 43. The zoom lens 41 is driven by a zoom pulse motor 44, to move along an optical axis of the taking lens 13. The stop 42 is driven by an iris motor 45, to change its aperture size in order to control the amount of light traveling from the subject to a photoreceptive surface of a CCD image sensor 48, as set forth later. The focusing lens 43 is driven by a focus pulse motor 46, to move along the optical axis.

The motors 44 to 46 are connected to a motor driver 47, which is connected to the system controller 40, so the motor driver 47 sends drive pulses to the motors 44 to 46 according to commands from the system controller 40. The drive pulses drive the motors 44 to 46 to rotate. The system controller 40 functions as a zoom position detector that detects a zoom position of the zoom lens 41 by counting the number of drive pulses supplied to the zoom pulse motor 44. For example, the system controller 40 counts up the number of drive pulses while the zoom lens 41 is moving toward a telephoto end, and counts down the pulse number while the zoom lens 41 is moving toward a wide-angle end. The system controller 40 simultaneously detects the position of the focusing lens 43 by counting the number of drive pulses supplied to the focus pulse motor 46, hereinafter referred to as the focus pulse number. For example, the system controller 40 counts up the focus pulse number while the focusing lens 43 is moving toward a near end, and counts down the focus pulse number while the focusing lens 43 is moving toward a far end of an object distance range.

The CCD image sensor 48 is placed behind the taking lens 13. The photoreceptive surface of the CCD image sensor 48 is constituted of light receiving elements, e.g. photo diodes, arranged in a two dimensional matrix. The optical image of the subject, which is formed through the taking lens 13 on the photoreceptive surface, is converted into an electronic image signal, as the individual photo diode accumulates an electric charge corresponding to the amount of received light. The charges accumulated in the respective photo diodes are sequentially read as an image signal whose voltage varies according to the accumulated amount of charges. The timing of reading the charges out of the CCD image sensor 48 is controlled based on clock pulses generated from a CCD driver 49.

The image signal outputted from the CCD image sensor 48 is fed to an analog signal processor 50 consisting of a correlated double sampling (CDS) circuit 50a, an automatic gain control amplifier (AMP) 50b and an analog/digital converter (A/D) 50c.

The CDS circuit 50a eliminates amplification noises and reset noises, as caused by the CCD image sensor 48, from the image signal. The amplifier 50b is a first amplification device. The system controller 40 gets data on imaging sensitivity from a later-mentioned imaging sensitivity setting circuit, and controls the amplifier 50b to amplify the image signal with a gain corresponding to the imaging sensitivity. The A/D converter 50c converts the analog image signal to a digital image signal, called image data.

A timing generator (TG) 51 applies a timing signal to the CCD driver 49 and the analog signal processor 50, to synchronize the operations of the respective circuits. Based on the timing signal, the CCD driver 49 outputs the clock pulses to the CCD image sensor 48, to determine the electronic shutter speed (exposure time) of the CCD image sensor 48. Namely, the system controller 40 controls an exposure operation by controlling the aperture value of the stop 42 and the exposure time of the CCD image sensor 48.

The analog signal processor 50 is connected to an image input controller 52. The image input controller 52 is connected to an SDRAM 54 through a data bus 53, to write the image data one frame after another in the SDRAM 54. Besides the image input controller 52 and the SDRAM 54, a digital signal processor circuit 55, a compander circuit 56, an LCD driver, a media controller 58, an automatic exposure control (AE) circuit 59, an automatic focusing (AF) circuit 60 and the imaging sensitivity setting circuit 61 are connected to the data bus 53.

The digital signal processor circuit 55 processes the image data as stored in the SDRAM 54 for gradation conversion, edge enhancement, noise reduction, white-balance correction, YC conversion and so forth. As known in the art, the image data is picked up at a lower resolution to display the camera-through image in comparison with the image data captured in response to the full-pressing of the shutter button 28. The low resolution image data is sequentially read out of the SDRAM 45 in response to a command from the system controller 40, and is sent to the LCD driver 57, to display the camera-through image on the LCD 16.

As described above, the shutter button 28 is a two-step switch. When the shutter button 28 is pressed lightly or halfway, a first step switch is turned on to start the preparatory processes for shooting, including AE and AF processes as set forth in detail later. When the shutter button 28 is pressed further to the full, a final or main exposure of the CCD image sensor 48 is executed at an exposure value decided by the AE process.

As a result of the main exposure, the image data of a higher resolution than that for displaying the camera-through image is written in the SDRAM 54, and then the image data is processed in the same way as described above. The processed image data is compressed to a predetermined compression format, e.g. JPEG format, by the compander circuit 56. The compressed image data is written in the recording medium 31 by the media controller 58.

In the reproduction mode, the media controller 58 reads the image data out of the recording medium 31, and the compander circuit 56 expands the image data and sends it to the LCD driver 57, to display a reproduced image on the LCD 16.

The AE circuit 59 is a photometric device for measuring subject brightness based on the image data written in the SDRAM 54 when the shutter button 28 is pressed halfway. The AE circuit 59 detects an AE evaluation value for a proper exposure value, and outputs the AE evaluation value to the system controller 40. The AF circuit 60 is an integration device that extracts high-frequency components of the image data, and integrates the high-frequency components. While the focusing lens 43 is being moved along the optical axis in response to the half-pressing of the shutter button 28, the AF circuit 60 calculates an integration value of high-frequency components of the image data and outputs the integration value as an AF evaluation value to the system controller 40, each time the image data is written in the SDRAM 54, as being obtained at predetermined intervals, i.e. from different positions of the focusing lens 43.

Based on the AE evaluation value, the system controller 40 decides an aperture size of the stop 42, and an electronic shutter speed of the CCD image sensor 48. The system controller 40 checks the AF evaluation values obtained at the different positions of the focusing lens 43, to detect a lens position where the AF evaluation value becomes the largest. Namely, the system controller 40 is a judging device that detects the position of the focusing lens 43 where the AF evaluation value becomes the largest among those obtained from the AF circuit 60, and judges it to be an in-focus position. Thus, the AF circuit 60 and the system controller 40 constitute an in-focus position detecting device. When the in-focus position is detected in this way, the focusing lens 43 is set to the in-focus position.

The imaging sensitivity setting circuit 61 is a device for setting the imaging sensitivity based on the present focal distance of the taking lens 13, i.e. the present zoom position of the zoom lens 41, and the in-focus position of the focusing lens 43. The imaging sensitivity setting circuit 61 decides the imaging sensitivity and outputs data of the imaging sensitivity to the system controller 40 when the shutter button 28 is pressed halfway.

Figure 4:
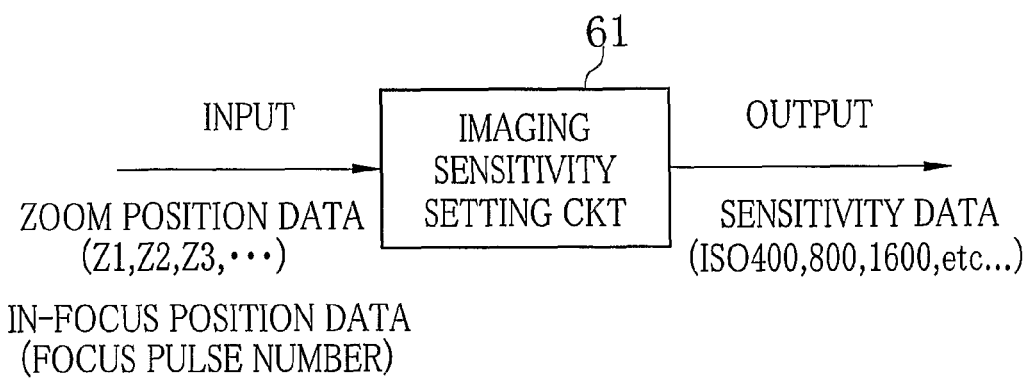
FIG. 4 is an explanatory diagram illustrating data inputted into and outputted from an imaging sensitivity setting circuit.

As shown in FIG. 4, the imaging sensitivity setting circuit 61 receives zoom position data as data of the present focal length, and the number of focus pulses applied to the focus pulse motor 46 as data of the in-focus position. Based on these data, the imaging sensitivity setting circuit 61 decides an optimum level of the imaging sensitivity, and outputs data of the optimum imaging sensitivity level to the system controller 40. In the present embodiment, the imaging sensitivity is selected among three levels, e.g. ISO400, ISO800 or ISO1600.

Figure 5:
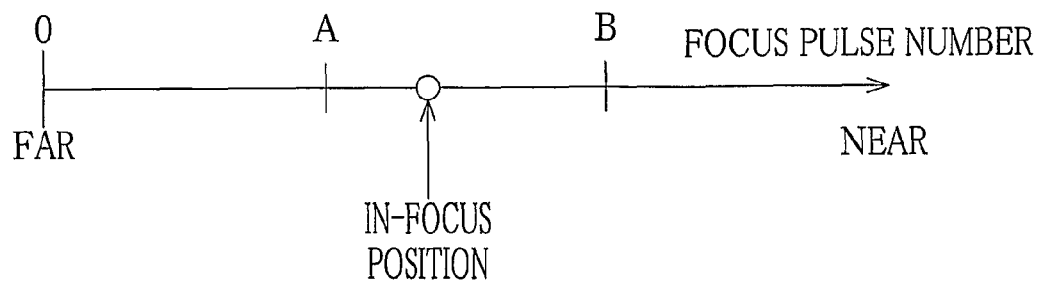
FIG. 5 is an explanatory diagram illustrating distance range selection parameters.

Specifically, the imaging sensitivity setting circuit 61 stores table data as shown in Table 1 below, which shows pairs of distance range selection parameters "A" and "B", each pair being allocated to one of predetermined zoom positions Z1 to Z10. The distance range selection parameters "A" and "B" are set as the focus pulse numbers. As shown in FIG. 5, the distance range selection parameters "A" and "B" are set between the far end and the near end of the focusing lens 43, wherein the far end corresponds to zero in the focus pulse number, and the distance range selection parameter "A" is on the side of the far end, whereas the distance range selection parameter "B" is on the side of the near end.

TABLE 1

| ZOOM POSITION | DISTANCE RANGE SELECTION PARAMETER (Pulse Number) | |
|---|---|---|
| | A | B |
| Z1 (Wide) | 2 | 6 |
| Z2 | 3 | 7 |
| Z3 | 3 | 8 |
| Z4 | 4 | 10 |
| Z5 | 6 | 14 |
| Z6 | 10 | 18 |
| Z7 | 14 | 26 |
| Z8 | 19 | 39 |
| Z9 | 25 | 58 |
| Z10 (TELE) | 40 | 86 |

The imaging sensitivity setting circuit 61 gets the zoom position data Z1 to Z10 and the focus pulse number as the in-focus position data from the system controller 40, and selects a pair of distance range selection parameters "A" and "B" corresponding to the present zoom position. Thereafter, the imaging sensitivity setting circuit 61 detects with reference to the focus pulse number whether the in-focus position is in a far range from the far end to the distance range selection parameter "A", a middle range between the distance range selection parameters "A" and "B", or a near range from the distance range selection parameter "B" to the near end.

If the in-focus position is in the far range from the far end to the distance range selection parameter "A", the imaging sensitivity setting circuit 61 sets the imaging sensitivity at a high level. If the in-focus position is in the middle range between the distance range selection parameters "A" and "B", the imaging sensitivity setting circuit 61 sets the imaging sensitivity at a middle level. If the in-focus position is in the near range from the distance range selection parameter "B" to the near end, the imaging sensitivity setting circuit 61 sets the imaging sensitivity at a low level. Thereafter the imaging sensitivity setting circuit 61 outputs data of the decided imaging sensitivity level to the system controller 40.

The system controller 40 is connected also to a flash device 62 for emitting a flashlight to the subject. The system controller 40 controls the flash device 62 to control volume of the flashlight.

Figure 6:
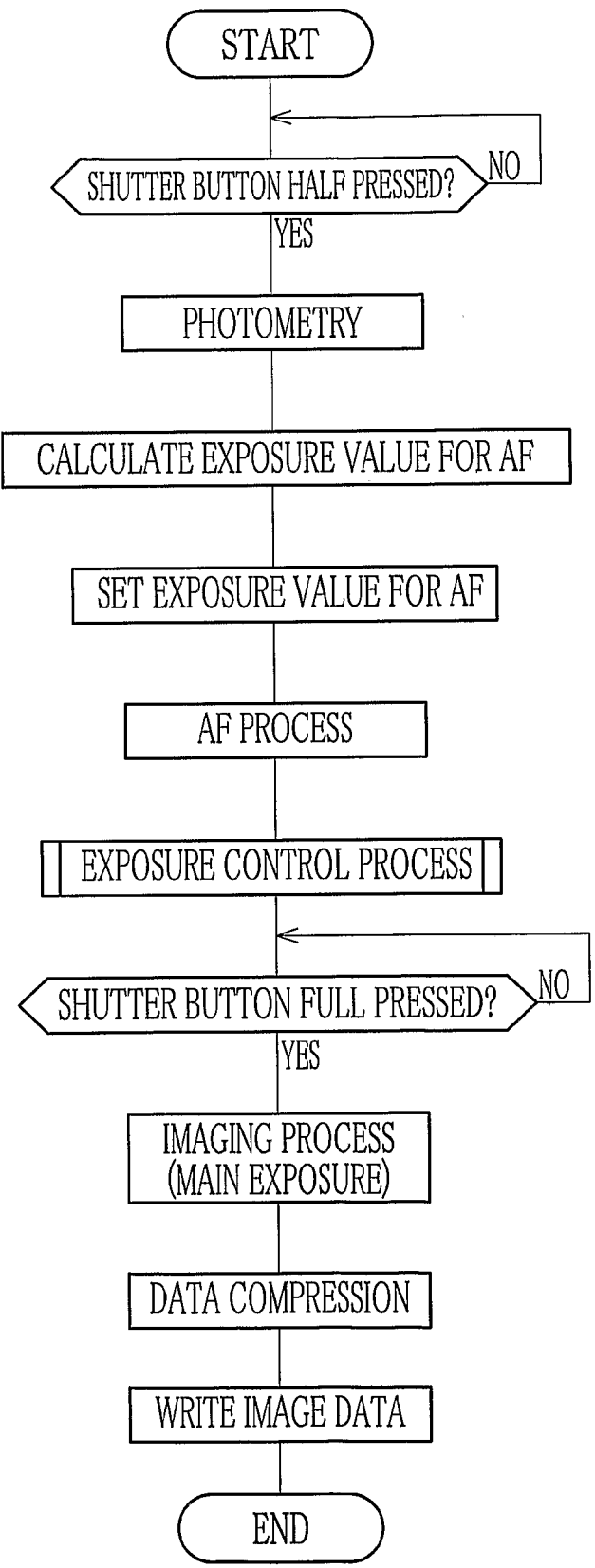
FIG. 6 is a flow chart illustrating a shooting operation of the digital camera.

Now the operation of the digital camera in the shooting mode will be described with reference to the flow chart of FIG. 6.

When the digital camera 10 is powered on and set in the shooting mode, the LCD 16 displays the camera-through image and the system controller 40 checks if the shutter button 28 is pressed halfway. If not, the system controller 40 standbys for the half-pressing of the shutter button 28.

Upon detecting that the shutter button 28 is pressed halfway, the system controller 40 controls the AE circuit 59 to make a photometry process, wherein the AE circuit 59 measures subject brightness from the low resolution image data as written in the SDRAM 54, and outputs the AE evaluation value to the system controller 40. Based on the AE evaluation value, the system controller 40 calculates an exposure value for the AF process, to set an aperture size of the stop 42 and an electronic shutter speed of the CCD image sensor 48 for the AF process. Under this exposure condition, the CCD image sensor 48 picks up image signal, and obtained image data is sequentially written in the SDRAM 54.

Simultaneously, the system controller 40 controls the motor driver 47 to drive the focusing lens 43 to move from the far end to the near end, and controls the AF circuit 60 to make the AF process. In the AF process, the AF circuit 60 calculates an AF evaluation value based on the image data written in the SDRAM 54 at each position of the focusing lens 43 between the far end and the near end, and outputs the AF evaluation value one by one to the system controller 40.

The system controller 40 gets the AF evaluation values at different positions of the focusing lens 43 between the far end and the near end, and detects a lens position, i.e. a focus pulse number, where the AF evaluation value becomes the largest, as an in-focus position of the focusing lens 43.

Figure 7:
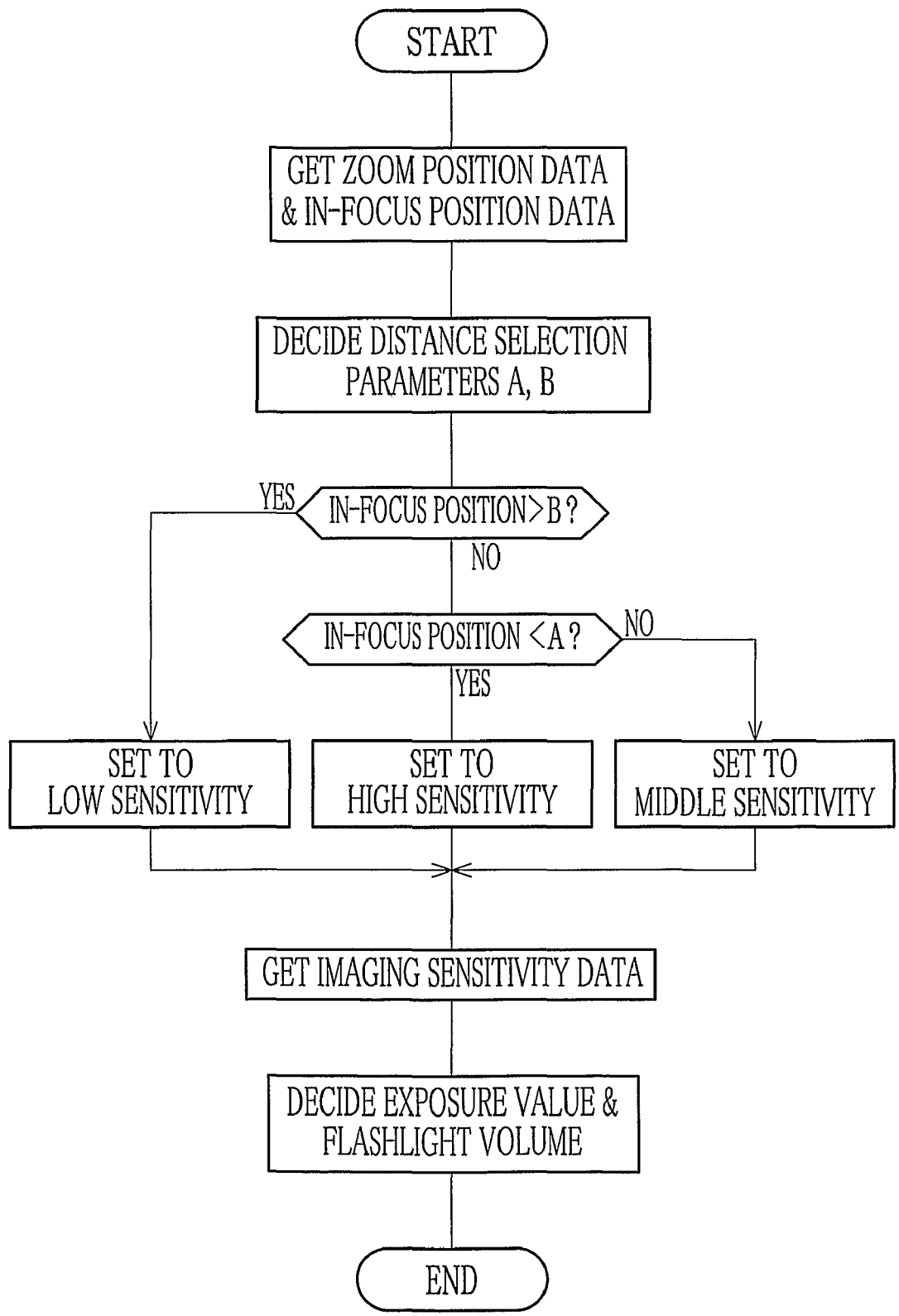
FIG. 7 is a flow chart illustrating an exposure control process in the shooting operation.

Thereafter, the system controller 40 carries out an exposure control process as shown in the flow chart of FIG. 7. The system controller 40 outputs the zoom position data (Z1 to Z10) representative of the present position of the zoom lens 41, and the in-focus position data of the focusing lens 43, the focus pulse number of the in-focus position, to the imaging sensitivity setting circuit 61.

Referring to the above Table 1 based the zoom position data and the in-focus position data, the imaging sensitivity setting circuit 61 sets the distance range selection parameters "A" and "B" corresponding to the present zoom position. For example, if the zoom position data is Z6, the distance range selection parameters "A" and "B" are set to be 10 and 18 respectively.

Thereafter, the imaging sensitivity setting circuit 61 compares the focus pulse number of the in-focus position with the distance range selection parameter "B". If the focus pulse number is larger than the distance range selection parameter "B", the imaging sensitivity setting circuit 61 sets the imaging sensitivity at the low value, e.g. ISO400. If the focus pulse number is equal to or less than the distance range selection parameter "B", the imaging sensitivity setting circuit 61 compares the focus pulse number with the distance range selection parameter "A".

If the focus pulse number is larger than the distance range selection parameter "A", the imaging sensitivity setting circuit 61 sets the imaging sensitivity at the middle value, e.g. ISO800. If the focus pulse number is equal to or less than the distance range selection parameter "A", the imaging sensitivity setting circuit 61 sets the imaging sensitivity at the high value, e.g. ISO1600. The imaging sensitivity setting circuit 61 outputs data of the decided imaging sensitivity to the system controller 40.

Then, the system controller 40 sets the volume of flashlight and the exposure value based on the AE evaluation value and the decided imaging sensitivity. The system controller 40 also controls the amplifier 50b to set a gain value corresponding to the decided imaging sensitivity.

Thereafter, the system controller 40 checks if the shutter button 28 is pressed to the full. If not, the system controller 40 standbys for the full-pressing of the shutter button 28. Upon detecting that the shutter button 28 is pressed to the full, the system controller 40 drives the CCD image sensor 48 to make the imaging process, while controlling the aperture size of the stop 42 and the electronic shutter speed of the CCD image sensor 48 according to both the exposure value and the volume of flashlight.

On the imaging process, the system controller 40 also controls the amplifier 50b to amplify the analog image signal outputted from the CCD image sensor 48 with a gain corresponding to the decided imaging sensitivity. Thereafter, the analog image signal is converted into digital image data, and the image data is written in the SDRAM 54.

Thereafter, the system controller 40 controls the digital signal processor circuit 55 to process the high resolution image data as written in the SDRAM 54, and controls the compander circuit 56 to compress the processed image data.

The system controller 40 controls the media controller 58 to write the compressed image data in the recording medium 31, thereby completing one shooting operation.

In the above-described shooting operation, an image is taken at an imaging sensitivity level that is decided based on the zoom position and the in-focus position. Indeed it is the best that an adequate image can be taken by a single exposure at an optimum imaging sensitivity, but the detected in-focus position does not always correspond to the proper subject distance, because the focus of the taking lens can deviate due to its temperature characteristics, or the lens position can fluctuate due to waste or aging of the driving mechanisms for the zoom lens and the focusing lens. Furthermore, some photographers like to make much of reproduction of the background even while the main subject is a little over-exposed, and others have different testes. For these reasons, it is possible to take a plural number of pictures of the same scene at different imaging sensitivity levels, so that the photographer may select a preferable one or more.

Figure 8:
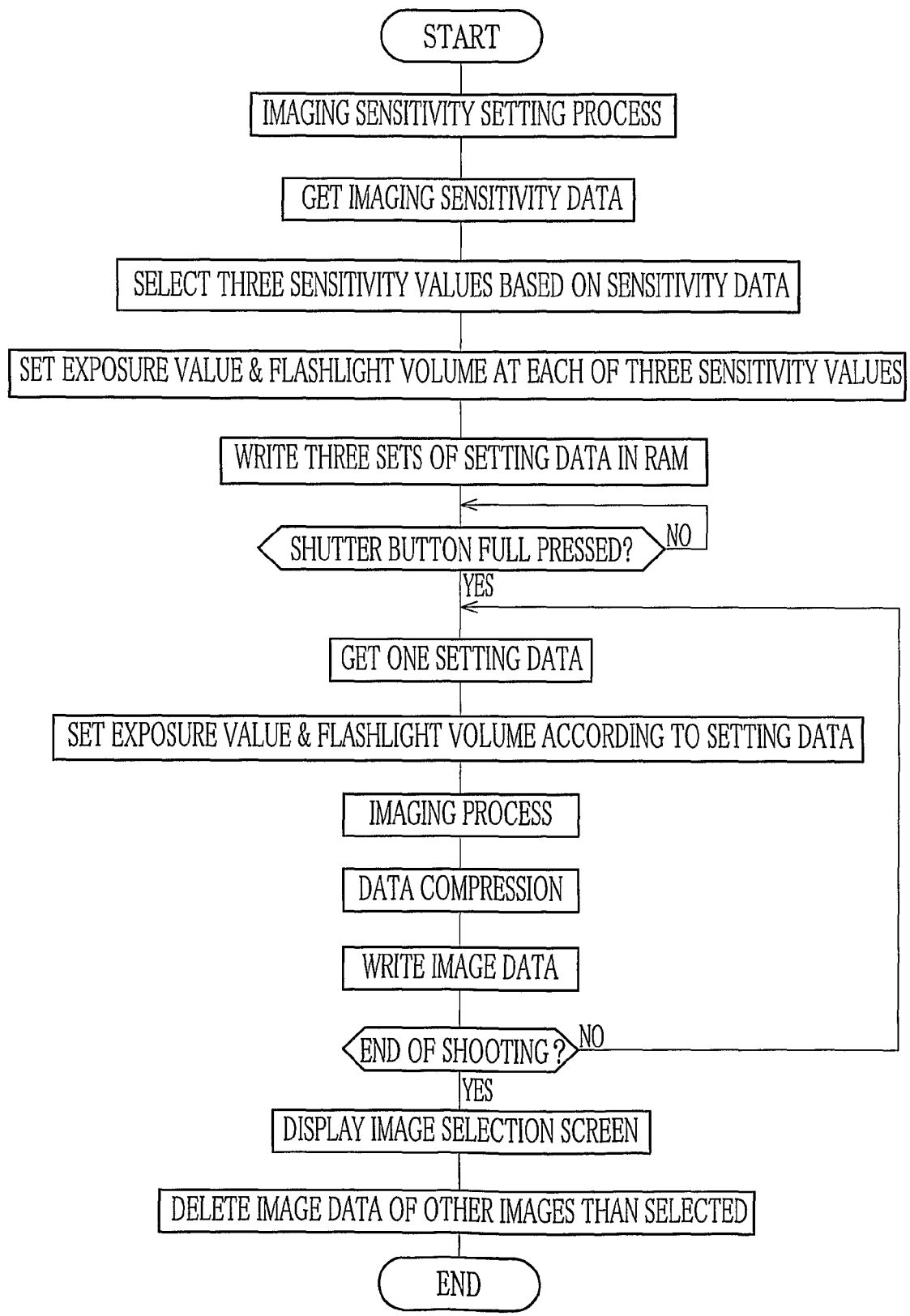
FIG. 8 is a flow chart illustrating another shooting operation of the digital camera, wherein successive exposures are made at different imaging sensitivity levels.

Now another shooting operation of the digital camera 10 will be described with reference to the flow chart of FIG. 8, wherein a plural number of imaging sensitivity levels are set to make a corresponding number of exposures at the respective imaging sensitivity levels. Because the same processes are carried out from the start to the AF process as in the above-described sequence shown in FIG. 6, the illustration and description of these processes are omitted, and the following description relates merely to those features essential to the present embodiment.

After the AF process, the system controller 40 outputs data of the present zoom position (Z1 to Z10) and data of the in-focus position (focus pulse number) to the imaging sensitivity setting circuit 61.

The imaging sensitivity setting circuit 61 decides an optimum imaging sensitivity level in the same way as in the above-described exposure control process. Thereafter, the imaging sensitivity setting circuit 61 sets a lower imaging sensitivity level and a higher imaging sensitivity level than the optimum imaging sensitivity level besides the optimum imaging sensitivity level. For example, when the imaging sensitivity of ISO800 is decided to be optimum, the imaging sensitivity setting circuit 61 sets three imaging sensitivity levels of ISO400, ISO800 and ISO1600. The imaging sensitivity setting circuit 61 outputs the three imaging sensitivity levels to the system controller 40.

Corresponding to the three imaging sensitivity levels, the system controller 40 decides three combinations of set values: gain, exposure value and flashlight volume. Data of the three combinations of the set values, hereinafter called setting data, are written in the RAM 40b. Thereafter, the system controller 40 checks if the shutter button 28 is pressed to the full. If not, the system controller 40 standbys for the full-pressing of the shutter button 28.

Upon detecting that the shutter button 28 is pressed to the full, the system controller 40 executes the imaging process while controlling the appropriate components in accordance with one of the three setting data. The system controller 40 further controls the appropriate components, to process and compress obtained image data and write it in the recording medium 31.

Thereafter, the system controller 40 judges whether to end the shooting operation or not, by checking if three images have been written in the recording medium 31 since the last full-pressing of the shutter button 28. If not, the system controller 40 reads another one of the three setting data out of the RAM 40b, and executes the imaging process at another imaging sensitivity level and another exposure value and with another flashlight volume. Obtained image data is processed, compressed and written in the recording medium 31.

When it is determined that three images have been written in the recording medium 31 since the last full-pressing of the shutter button 28, the system controller 40 controls the media controller 58 to read the image data of the last three images out of the recording medium 31, and controls the compander circuit 56 to expand the read image data.

Figure 9:
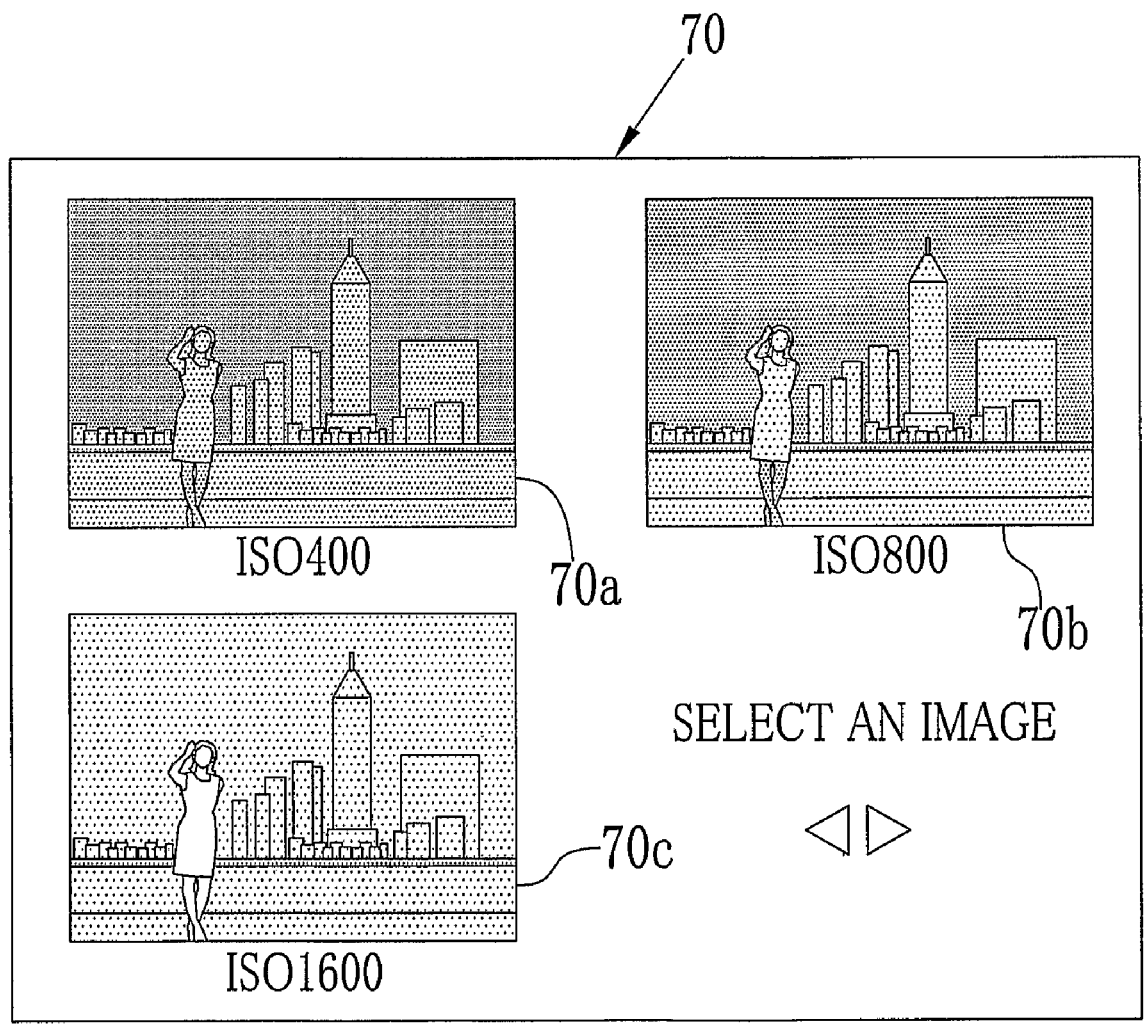
FIG. 9 is an explanatory diagram illustrating an image selection screen for selecting an image from those successively shot at the different imaging sensitivity levels.

Then the system controller 40 controls the LCD driver 57 to display an image selection screen 70 on the LCD 16, as shown for example in FIG. 9. The image selection screen 70 displays the three images 71a, 71b and 71c in a reduced size, so the photographer may select a preferable one or more of them by operating the operating section 18.

After the image selection, the system controller 40 deletes the image data of other images than selected from the recording medium 31, and ends the shooting operation.

In the above-described embodiment, the image selection screen 70 is displayed for the photographer to select preferable images, and the image data of unselected images are automatically deleted. However, it is possible not to display such an image selection screen, but the photographer may delete unnecessary image data by operating the operating section 18 after the shooting operation. Although the above-described embodiment sets three imaging sensitivity levels in one exposure control process, it is possible to set two or four or more than four imaging sensitivity levels.

Figure 10:
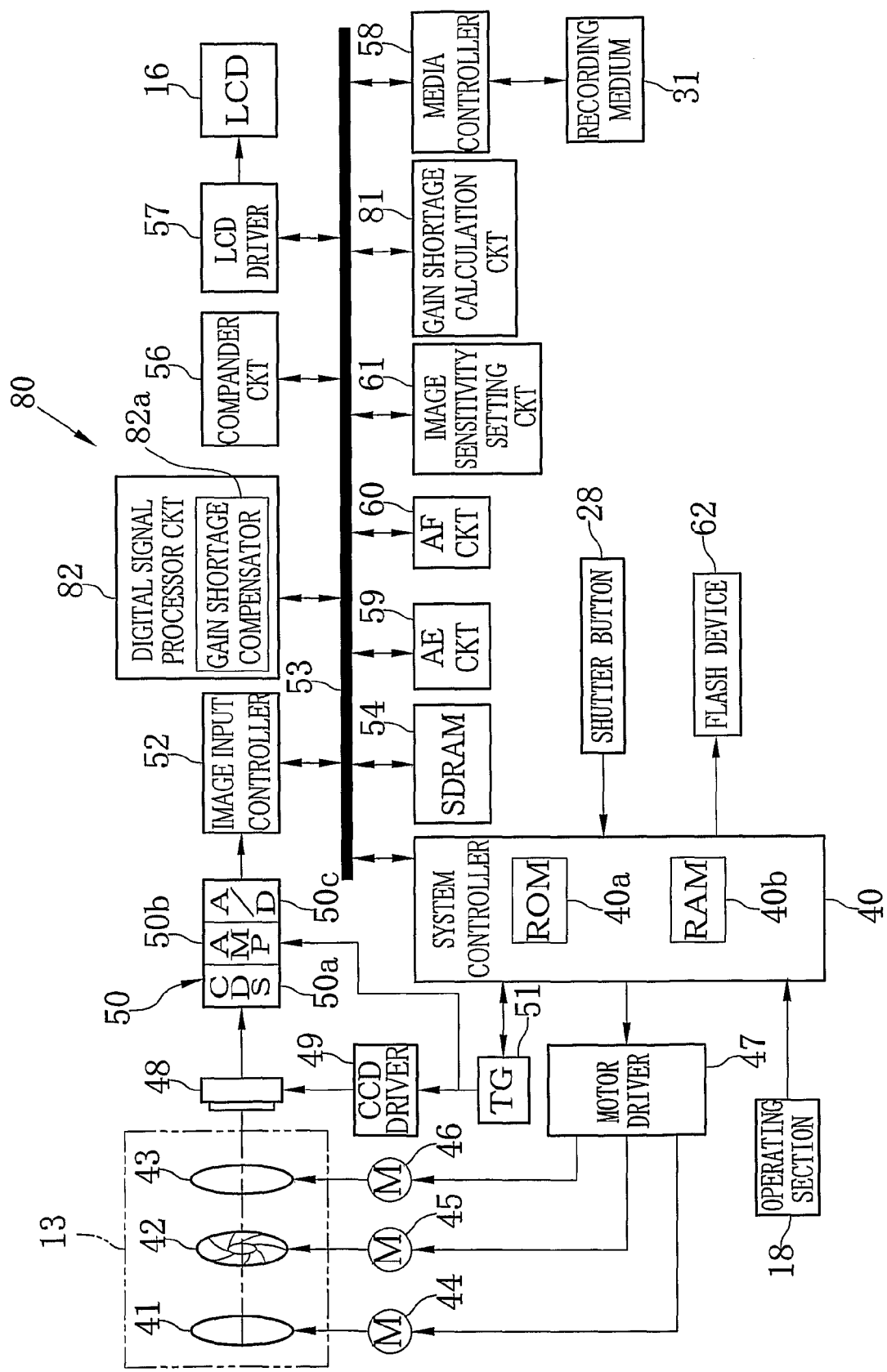
FIG. 10 is a block diagram illustrating the circuitry of the digital camera according to a second embodiment, wherein a shortage of gain is calculated based on image data, to compensate for the gain shortage.
Figure 11:
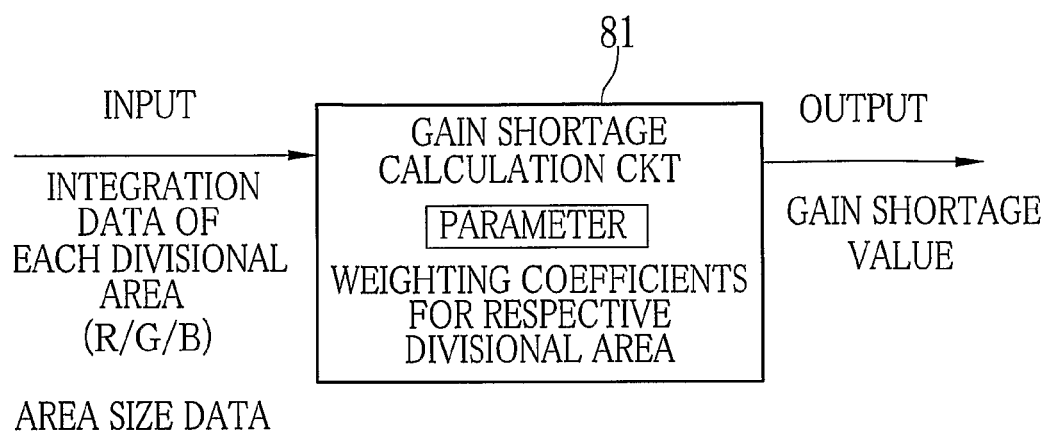
FIG. 11 is an explanatory diagram illustrating input data and output data of a gain shortage calculation circuit of the digital camera according to the second embodiment.

FIG. 10 shows a digital camera 80 according to a second embodiment of the present invention. The digital camera 80 is provided with a gain shortage calculation circuit 81 and a digital signal processor circuit 82 including a gain shortage compensator 82a. The gain shortage calculation circuit 81 calculates a shortage of gain with respect to the image data written in an SDRAM 54. As shown in FIG. 11, the gain shortage calculation circuit 81 receives integration data and area size data on each of divisional photometric areas, as set forth in detail later, and calculates a gain shortage value based on these data.

Figure 12:
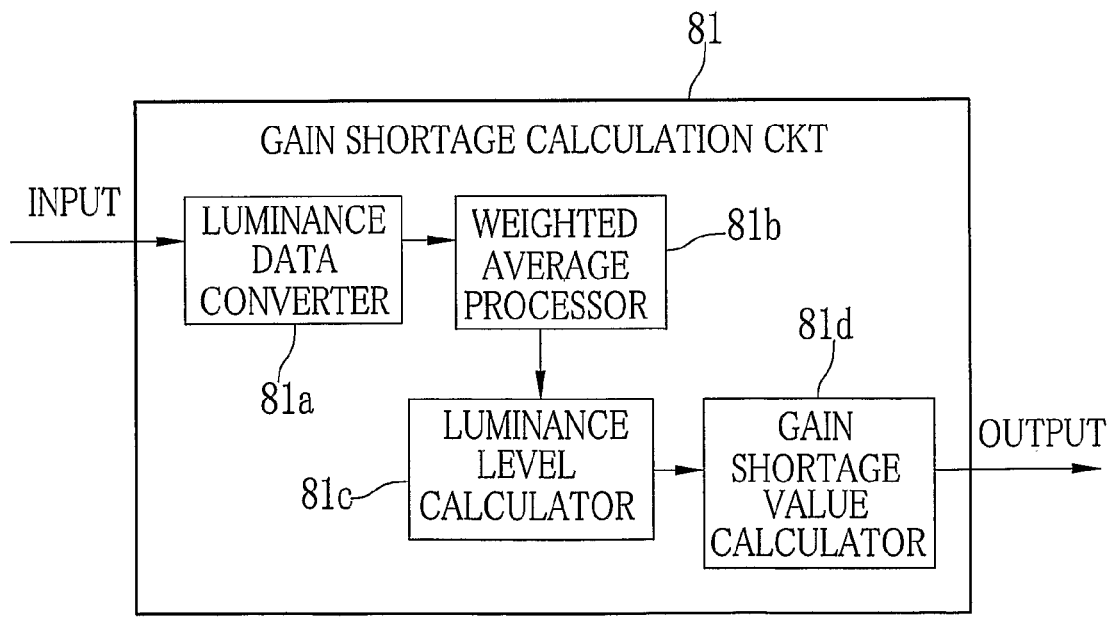
FIG. 12 is a schematic diagram illustrating a structure of the gain shortage calculation circuit of the digital camera according to the second embodiment.

More specifically, as shown in FIG. 12, the gain shortage calculation circuit 81 is provided with a luminance data converter 81a, a weighted average processor 81b, a luminance level calculator 81c and a gain shortage value calculator 81d. The above-mentioned integration data and the area size data are inputted into the luminance data converter 81a. Image data of one frame is divided into a predetermined number of photometric divisional areas. The integration data of each divisional photometric area represents integration values of red, green and blue pixels of the divisional area, and the area size data represents the number of pixels in the divisional area. The present embodiment will be described with respect to a case where the image data is divided into 64 divisional areas, but the number of divisions can change appropriately. The R/G/B integration data of each divisional area may be calculated by a system controller 40, or an AE circuit 59.

The luminance data converter 81a gets the integration data of three colors R(i), G(i) and B(i) from each of the divisional areas, and calculates a luminance value Y(i) of each divisional area according to the following formula (1), wherein "i" represents a serial number of one divisional area, and i=0 to 63 in the present embodiment:

$$Y(i)=0.6 \times G(i)+0.3 \times R(i)+0.1 \times B(i) \tag{1}$$

Then, the luminance data converter 81a outputs the luminance value Y(i) to the weighted average processor 81b.

Thereafter, the weighted average processor 81b calculates a weighted average of the luminance data Y(i). Concretely, the weighted average processor 81b weights the luminance data Y(i) of each divisional area with a weighting coefficient variable according to the location of the area in one image frame, as shown in FIG. 13, on the assumption that a main subject is placed in the center of the image frame. Thereafter, the weighted average processor 81b calculates the weighted average Yk of the luminance value Y(i) of all divisional areas according to the following formula (2), and outputs the weighted average Yk to the luminance level calculator 81c:

$$Yk = \sum_{i=0}^{63} Wi \times Y(i) \Big/ \sum_{i=0}^{63} Wi \tag{2}$$

The luminance level calculator 81c is fed with the weighted average Yk and the number of pixels of one area. So the luminance level calculator 81c calculates a luminance level Yp per one pixel according to the following formula (3), and outputs the luminance level Yp to the gain shortage value calculator 81d:

$$Yp=Yk/\text{pixel number of one area} \tag{3}$$

The gain shortage value calculator 81d calculates a gain shortage value (crct_gain) according to the following formula (4), and outputs the gain shortage value (crct_gain) to the digital signal processor circuit 82:

$$\text{crct\_gain} = \text{expected level}/Yp \tag{4}$$

The digital signal processor circuit 82 is provided with the gain shortage compensator 82a as a second amplification device. Based on the gain shortage value (crct_gain), the gain shortage compensator 82a adjusts gain of the image data as written in the SDRAM 54, thereby to compensate the shortage of the gain of the image data.

The above-described features of the digital camera 80 are essential to the present embodiment, and other features are the same as those of the digital camera 10, so the same reference numerals are used for the same components and the detailed description of these components are omitted.

Figure 14:
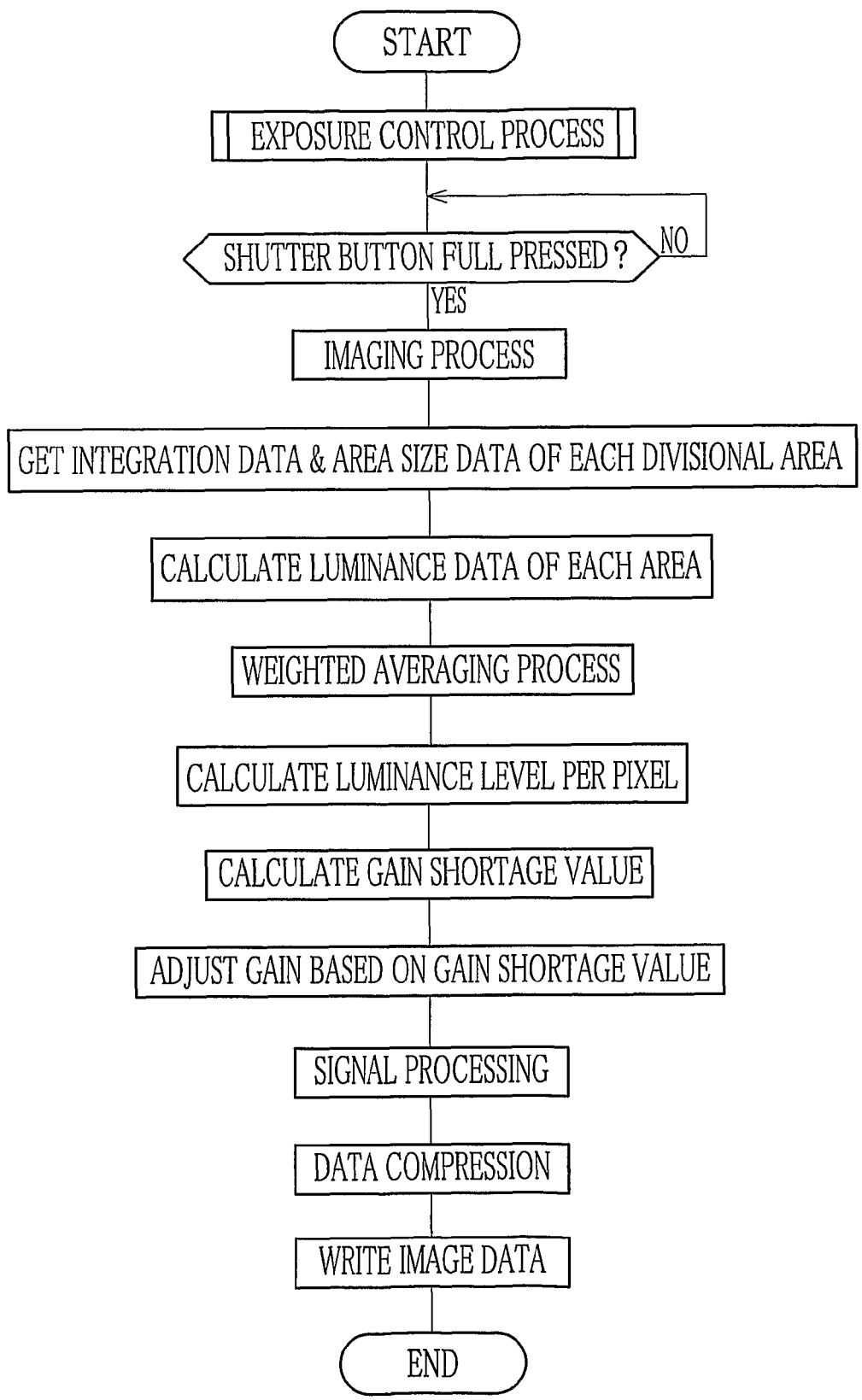
FIG. 14 is a flow chart illustrating a shooting operation of the digital camera according to the second embodiment.

Now the operation of the digital camera 80 in the shooting mode will be described with reference to the flow chart of FIG. 14. Because the same processes are carried out from the start to the exposure control process as in the first embodiment, the illustration and description of these processes are omitted. Like in the digital camera 10, the system controller 40 checks if a shutter button 28 is pressed to the full when the exposure control process is finished.

If not, the system controller 40 standbys for the full-pressing of the shutter button 28. Upon detecting that the shutter button 28 is pressed to the full, the system controller 40 controls the aperture size of the stop 42 and the electronic shutter speed of the CCD image sensor 48 according to the decided exposure value, and also controls the volume of flashlight, to make a main exposure of the CCD image sensor 48.

At that time, the system controller 40 controls an amplifier 50b to amplify the analog image signal taken by the CCD image sensor 48 with a gain decided by an imaging sensitivity setting circuit 61. Thereafter, the analog image signal is converted into high resolution digital image data, and the image data is written in the SDRAM 54.

Thereafter, the system controller 40 controls the gain shortage calculation circuit 81 to make the gain shortage calculation process. First, the system controller 40 feeds the gain shortage calculation circuit 81 with the integration data of each of the 64 divisional areas, and the area size data representative of the number of pixels of one divisional area.

The luminance data converter 81a of the gain shortage calculation circuit 81 calculates the luminance value Y(i) based on the integration values obtained for each of the three colors RGB, and outputs the luminance value Y(i) to the weighted average processor 81b. The weighted average processor 81b weights the luminance value Y(i) of the divisional areas with the respective weighting coefficients as shown in FIG. 13, and then calculates a weighted average Yk of the luminance value Y(i), and outputs the weighted average Yk to the luminance level calculator 81c.

Based on the weighted average Yk and the number of pixels of one area, the luminance level calculator 81c calculates a luminance level Yp per one pixel, and outputs the luminance level Yp to the gain shortage value calculator 81d. The gain shortage value calculator 81d calculates a gain shortage value (crct_gain), and outputs the gain shortage value (crct_gain) to the digital signal processor circuit 82.

Based on the gain shortage value (crct_gain), the gain shortage compensator 82a adjusts gain of the image data as written in the SDRAM 54, to compensate for the shortage of the gain.

Thereafter, the system controller 40 controls the digital signal processor circuit 82 to process the high resolution image data as written in the SDRAM 54, and controls the compander circuit 56 to compress the processed image data. Then the system controller 40 controls the media controller 58 to write the compressed image data in the recording medium 31, thereby completing one shooting operation.

Figure 15:
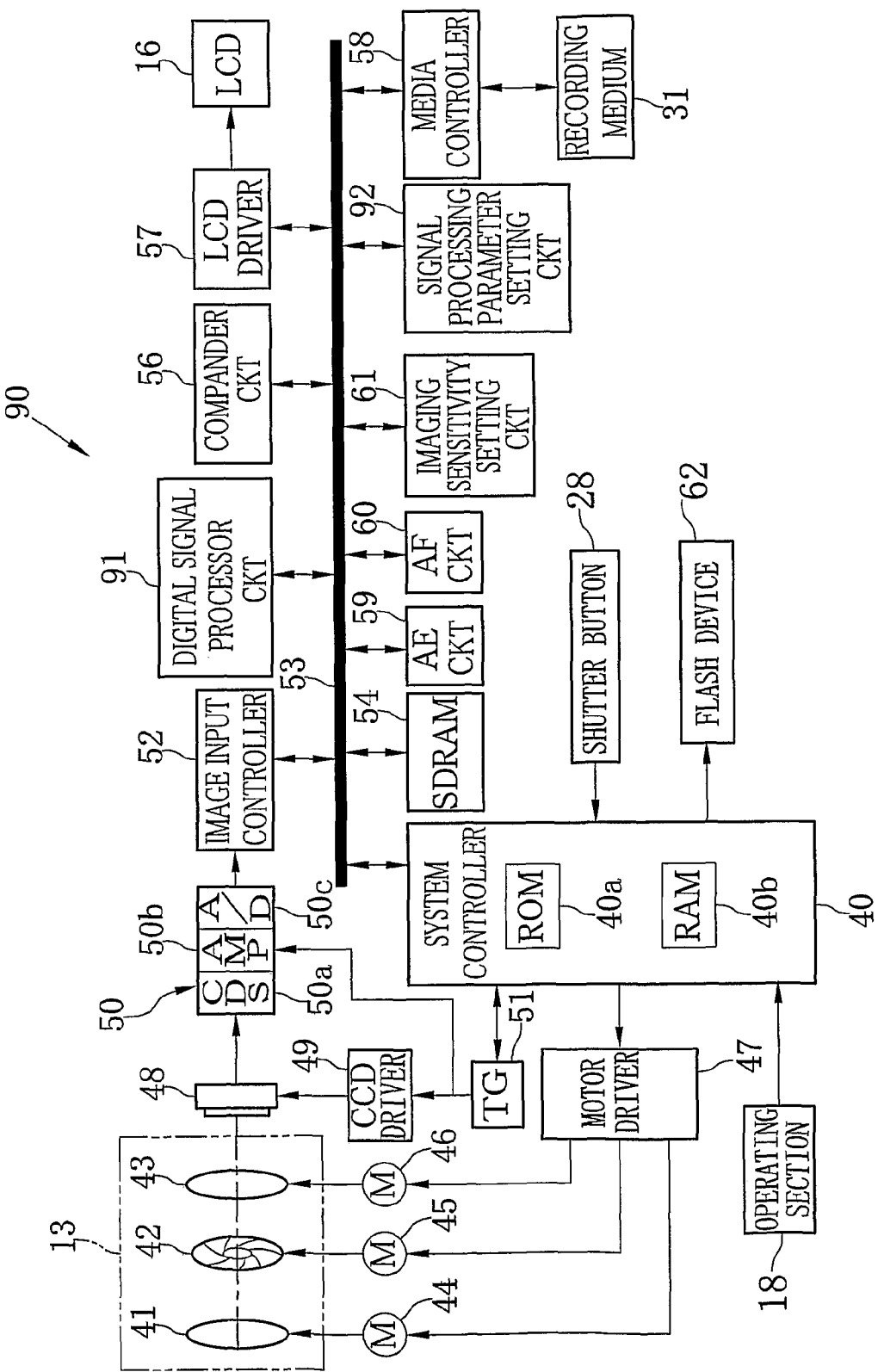
FIG. 15 is a block diagram illustrating the circuitry of the digital camera according to a third embodiment.
Figure 16:
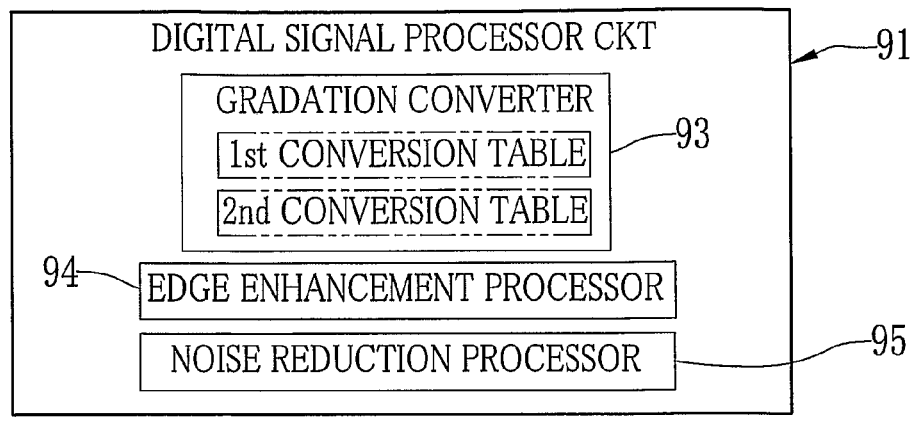
FIG. 16 is a schematic diagram illustrating a structure of a digital signal processor circuit of the digital camera according to the third embodiment.

Next a digital camera 90 according to a third embodiment will be described. The digital camera 90 as shown in FIG. 15 is provided with a digital signal processor circuit 91 and a signal processing parameter setting circuit 92. The digital signal processor circuit 91 is provided with a gradation converter 93, an edge enhancement processor 94 and a noise reduction processor 95, as shown in FIG. 16. The gradation converter 93, the edge enhancement processor 94 and the noise reduction processor 95 process the image data for gradation conversion, edge enhancement and noise reduction respectively based on an imaging sensitivity decided by an imaging sensitivity setting circuit 61.

The gradation converter 93 stores first and second conversion tables having different gradation conversion characteristics, either of which is selected according to the imaging sensitivity to use in the gradation conversion process of the image data. The edge enhancement processor 94 selects a range of correction amount according to the imaging sensitivity, to use in the edge enhancement process of the image data. The noise reduction processor 95 selects a filtering threshold value according to the imaging sensitivity, to use in the noise reduction process.

Specifically, the digital signal processor circuit 91 carries out the gradation conversion process, the edge enhancement process and the noise reduction process according to the imaging sensitivity in the way as shown in Table 2 below. As for the gradation conversion process, if the imaging sensitivity is set at a middle or a high level, the first conversion table representative of standard gradation conversion characteristics is used for the gradation conversion. If the imaging sensitivity is set at a low level, the second conversion table having such gradation conversion characteristics that prevent the bleach out of the image is used, because a flash shot can be carried out in a near range at the low imaging sensitivity level.

As for the edge enhancement process, if the imaging sensitivity is set at the middle value, the image data is edge-enhanced to a standard degree. If the imaging sensitivity is low, the image data is less affected by the noises because the gain through an amplifier 50b is small, so the image data is edge-enhanced to a small degree. On the contrary, if the imaging sensitivity is high, the image data is more affected by the noises because of the large gain through the amplifier 50b, so the degree of processing the image data for noise reduction is relatively large. As a result, the resolution of the image is often degraded. To make up for this, the edge-enhancement process is carried out to a large degree.

As for the noise reduction process, the image data is processed to a standard degree at the middle imaging sensitivity. If the imaging sensitivity is low, the image data is less affected by the noises, so the noise reduction process is carried out to a small degree. On the contrary, if the imaging sensitivity is high, the image data is more affected by the noises, so the noise reduction process is carried out to a large degree.

TABLE 2

| IMAGING SENSITIVITY | GRADATION CONVERSION | DEGREE OF EDGE ENHANCEMENT | DEGREE OF NOISE REDUCTION |
|---|---|---|---|
| Low | Bleach Out Prevention | Small | Small |
| Middle | Standard | Standard | Standard |
| High | Standard | Large | Large |

Figure 17:
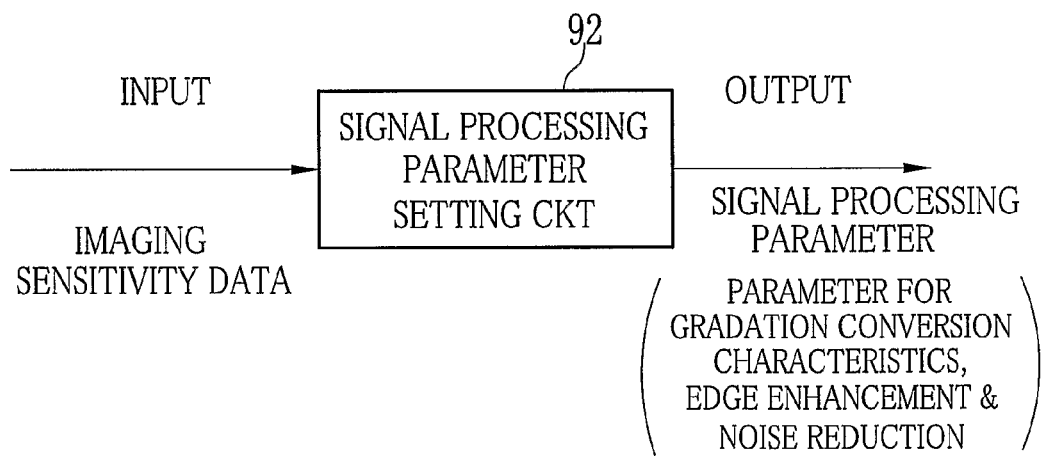
FIG. 17 is an explanatory diagram illustrating input data and output data of a signal processing parameter setting circuit of the digital camera according to the third embodiment.

The signal processing parameter setting circuit 92 is a setting value selection device that selects setting values for the various kinds of signal processing on the image data according to the decided imaging sensitivity level. As shown in FIG. 17, the signal processing parameter setting circuit 92 is fed with imaging sensitivity data. Based on the imaging sensitivity data, the signal processing parameter setting circuit 92 decides parameters for gradation conversion characteristics that correspond to one of the conversion tables used for the gradation conversion process, parameters for edge enhancement that show a range of correction amounts used for the edge correction process, and a noise reduction parameter that represents a filtering threshold value for use in the noise reduction process. The signal processing parameter setting circuit 92 outputs the parameters to the digital signal processor circuit 91.

Figure 18:
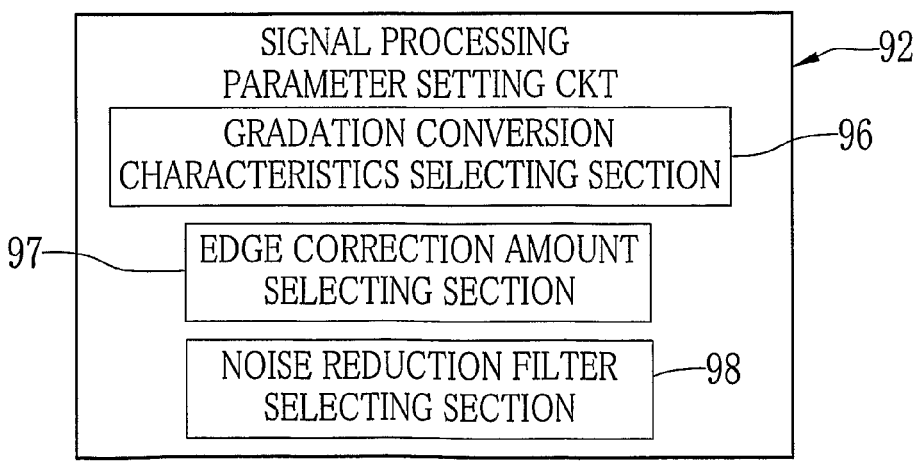
FIG. 18 is a schematic diagram illustrating a structure of the signal processing parameter setting circuit.

As shown in FIG. 18, the signal processing parameter setting circuit 92 is provided with a gradation conversion characteristic selecting section 96, an edge correction amount selecting section 97, and a noise reduction filter selecting section 98. The gradation conversion characteristics selecting section 96 selects based on the imaging sensitivity one of the two conversion tables having different gradation conversion characteristics, and outputs gradation conversion parameters corresponding to the selected conversion table. One of the conversion tables has such gradation conversion characteristics that prevent the bleach-out, whereas the other conversion table has standard gradation conversion characteristics.

Figure 19:
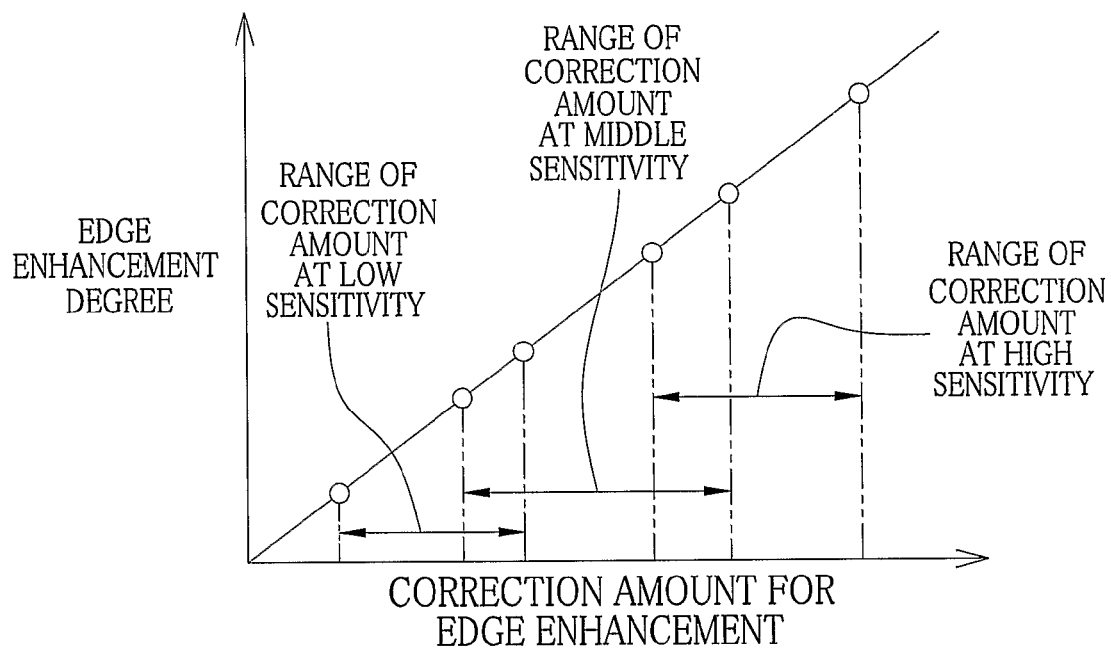
FIG. 19 is a graph illustrating correction amount ranges for use in an edge enhancement process, predetermined for different imaging sensitivity levels.

The edge correction amount selecting section 97 selects based on the imaging sensitivity a correction amount range corresponding to the imaging sensitivity from among three different correction amount ranges as shown in FIG. 19. Then the edge correction amount selecting section 97 outputs such edge enhancement parameters that correspond to the selected correction amount range. Note that a horizontal axis of the graph shown in FIG. 19 indicates the correction amounts for edge enhancement, and a vertical axis thereof indicates the degree of edge enhancement.

Figure 20:
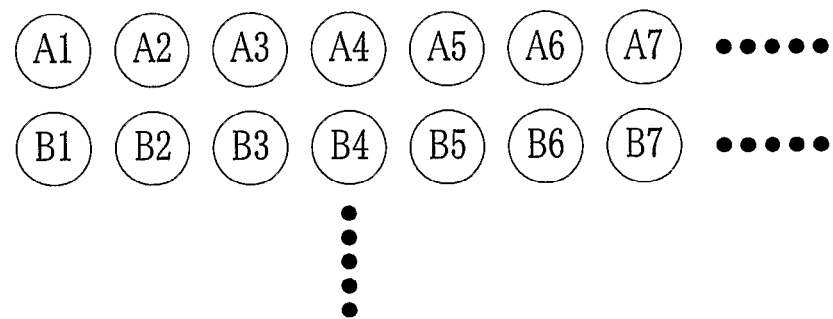
FIG. 20 is a pattern view illustrating a pixel arrangement.
Figure 21:
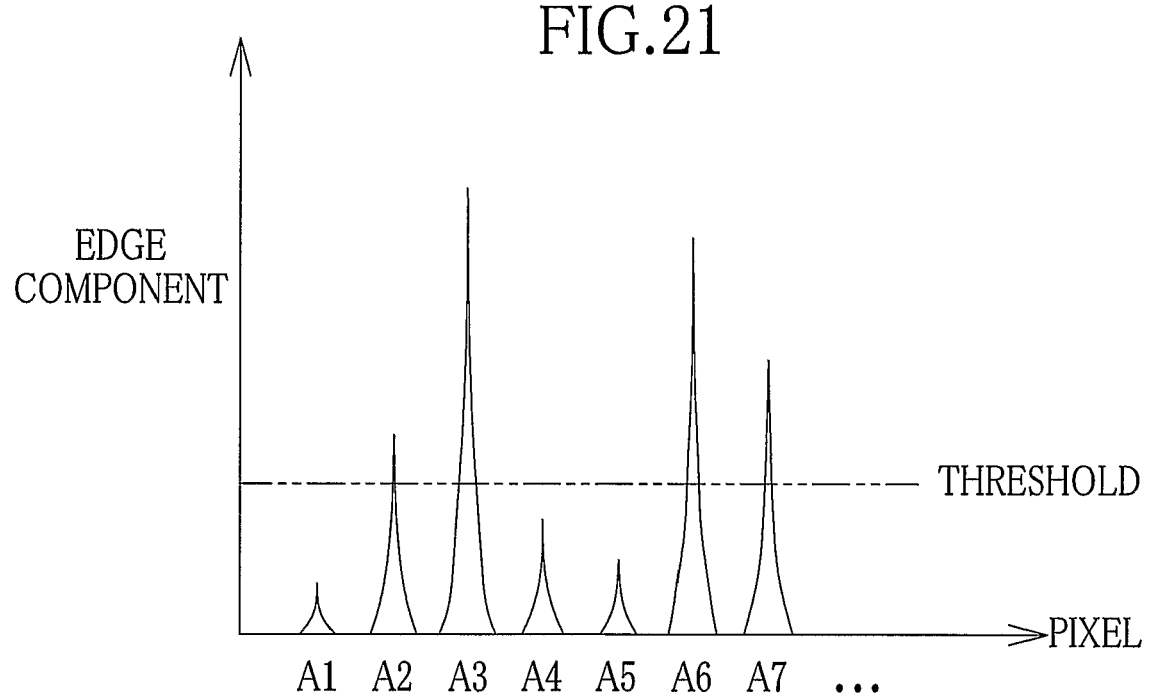
FIG. 21 is a graph illustrating edge components of individual pixels of one line.

In the noise reduction process, if pixels are arranged in the way as shown for example by A1 to A7 and so forth in FIG. 20, edge components are extracted from each pixel, and thereafter, those components which are below a filtering threshold value are eliminated, as shown in FIG. 21, and remaining signal components are added to the original signal. In this way, noise components are eliminated. In the noise reduction processor 95, the degree of noise reduction is adjusted by changing the filtering threshold value. The noise reduction filter selecting section 98 selects the filtering threshold value from among three options according to the imaging sensitivity, and outputs noise reduction parameters corresponding to the selected filtering threshold value.

The above-described features of the digital camera 90 are essential to the present embodiment, and other features are the same as those of the digital camera 10, so the same reference numerals are used for the same components, and the detailed description of these components are omitted.

Figure 22:
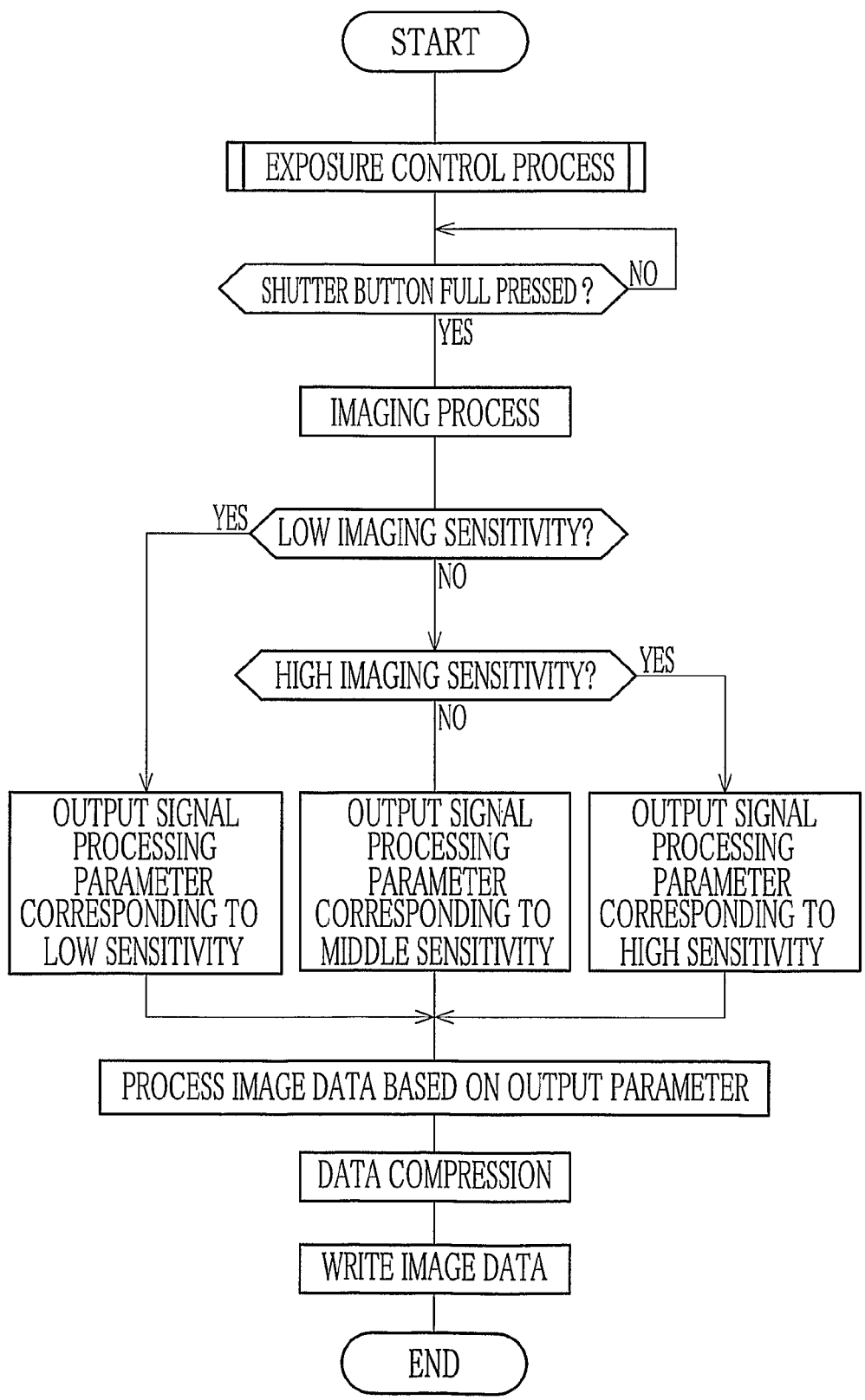
FIG. 22 is a flow chart illustrating a shooting operation of the digital camera according to the third embodiment, wherein image data is processed with those parameters corresponding to the imaging sensitivity.

Now the operation of the digital camera 90 in the shooting mode will be described with reference to the flow chart of FIG. 22. Because the same processes are carried out from the start to the exposure control process as in the first embodiment, the illustration and description of these processes are omitted. Like in the digital camera 10, a system controller 40 checks if a shutter button 28 is pressed to the full when the exposure control process is finished. If not, the system controller 40 standbys for the full-pressing of the shutter button 28.

Upon detecting that the shutter button 28 is pressed to the full, the system controller 40 drives a CCD image sensor 48 to execute an imaging process while controlling the aperture size of a stop 42 and the electronic shutter speed of the CCD image sensor 48 according to a decided exposure value, and the light volume from a flash device 62.

At that time, the system controller 40 controls the amplifier 50b to amplify the image signal taken by the CCD image sensor 48 with a gain decided by a set imaging sensitivity level. Thereafter, the analog image signal is converted into digital image data, and the image data is written in an SDRAM 54.

Thereafter the system controller 40 controls the signal processing parameter setting circuit 92 to execute the signal processing parameter setting process. The signal processing parameter setting circuit 92 judges whether the imaging sensitivity is low or not. If the imaging sensitivity is judged to be low, the signal processing parameter setting circuit 92 outputs those parameters for gradation conversion, edge enhancement and noise reduction which correspond to the low imaging sensitivity, to the digital signal processor circuit 91.

If the imaging sensitivity is not judged to be low, the signal processing parameter setting circuit 92 judges whether the decided imaging sensitivity is high or not. If the imaging sensitivity is judged to be high, the signal processing parameter setting circuit 92 outputs those parameters for gradation conversion, edge enhancement and noise reduction which correspond to the high imaging sensitivity, to the digital signal processor circuit 91.

If the imaging sensitivity is not judged to be high or low, the signal processing parameter setting circuit 92 outputs those parameters for gradation conversion, edge enhancement and noise reduction which correspond to the middle imaging sensitivity, to the digital signal processor circuit 91.

Thereafter, the system controller 40 controls the digital signal processor circuit 91 to process the high resolution image data as written in the SDRAM 54, for gradation conversion, edge enhancement and noise reduction. At that time the digital signal processor circuit 91 executes the gradation conversion process, the edge enhancement process and the noise reduction process based on the respective parameters.

Besides the gradation conversion process, the edge enhancement process and the noise reduction process, the digital signal processor circuit 91 executes a white-balance correction process and an YC conversion process and other signal processing treatments on the image data.

Thereafter, the system controller 40 controls a compander circuit 56 to compress the processed image data, and a media controller 58 to write the compressed image data in a recording medium 31, thereby completing one shooting operation.

Although the digital cameras 80 and 90 have been described with respect to a shooting operation where a main exposure is made at a single imaging sensitivity upon a shutter release operation, these embodiments are not limited to this operation, but may carry out a shooting operation where a plural number of exposures are made at different imaging sensitivity levels upon a shutter release operation, like as described with reference to the flow chart of FIG. 8.

Although the above-described embodiments select the imaging sensitivity from three options: low level (ISO400), middle level (ISO800) and high level (ISO1600), the present invention is not limited to this, but it is possible to select the imaging sensitivity from two or four or more than four options.

Furthermore, the in-focus position detecting device is not limited to the above-described embodiment, wherein the in-focus position of the focusing lens is detected from the contrast of the image while the focusing lens is-being moved along the optical axis. For example, an active or passive distance measuring device is usable for detecting the in-focus position of the focusing lens. In that case, the above Table 1 as the table data for the distance range selection parameters "A" and "B" may be replaced with the following Table 3, wherein a pair of object distances is allocated as the distance range selection parameters "A" and "B" to each zoom position (Z1 to Z10):

TABLE 3

| ZOOM POSITION | DISTANCE RANGE SELECTION PARAMETER | |
|---|---|---|
| | A | B |
| Z1 (Wide) | 8 m | 3 m |
| Z2 | 7.5 m | 2.5 m |
| Z3 | 6 m | 2.4 m |
| Z4 | 5.7 m | 2.4 m |
| Z5 | 5.5 m | 2.3 m |
| Z6 | 5 m | 2 m |
| Z7 | 4.5 m | 1.9 m |
| Z8 | 4.3 m | 1.9 m |
| Z9 | 4 m | 1.8 m |
| Z10 (Tele) | 4 m | 1.5 m |

Although the above embodiments use the pulse motors for driving the zoom lens and the focusing lens, DC motors are usable instead. In that case, encoders for detecting positions of these lenses should be disposed.

Although the light volume of the flash device is controlled based on the subject brightness and the imaging sensitivity in the above embodiment, it is possible in an imaging device with an automatic flashing function to calculate based on the subject brightness and the imaging sensitivity a light control value as a reference value for stopping the emission of the flashlight.

Although the CCD image sensor is used as the solid state imaging device in the above embodiments, another kind of imaging device, e.g. a CMOS image sensor, is usable instead.

INDUSTRIAL APPLICABILITY

Although the present invention has been described with respect to the embodiments applied to the digital camera, the present invention is not limited to the above embodiments, but applicable to a camera phone or a digital video camera.

The invention claimed is:

1. An imaging apparatus comprising a taking lens having a zoom lens and a focusing lens, a solid state imaging device for taking image signal from an optical image of a subject formed through said taking lens, and a flash device for emitting a flashlight to the subject, said imaging apparatus comprising:
a photometry device for measuring a brightness value of the subject;
a zoom position detecting device for detecting a zoom position of said zoom lens;

an in-focus position detecting device for detecting an in-focus position of said focusing lens;

an imaging sensitivity setting device for setting an imaging sensitivity based on the detected zoom position and the detected in-focus position;

a control device for controlling an exposure value and the volume of the flashlight from said flash device based on the measured subject brightness value and the set imaging sensitivity;

a first amplification device for amplifying the imaging signal as being outputted from said solid state imaging device with a gain corresponding to the set imaging sensitivity; and wherein said imaging sensitivity setting device sets the imaging sensitivity by means for selecting at least a distance range selection parameter representative of a threshold object distance, according to the zoom position, comparing data of the in-focus position with said distance range selection parameter, and setting the imaging sensitivity to a higher level or a lower level depending upon whether an object distance corresponding to the in-focus position is farther than said threshold object distance or not.

2. The imaging apparatus according to claim 1, further comprising an A/D converter that converts the image signal into digital image data, wherein said in-focus position detecting device comprises an integration device that extracts high-frequency components from the image data obtained at different positions of said focusing lens, and integrates the high-frequency components to obtain an integration value at each of the different positions of said focusing lens, and a judging device that detects the position of said focusing lens at which the integration value becomes the largest, to judge it to be the in-focus position.

3. The imaging apparatus according to claim 2, further comprising a gain shortage calculation device for calculating a gain shortage value by calculating a luminance value of the image data and comparing the calculated luminance value with a predetermined expected luminance value, and a second amplification device for amplifying signal level of the image data based on the calculated gain shortage value.

4. The imaging apparatus according to claim 2, further comprising a setting value selection device that selects setting values for various kinds of signal processing on the image data according to the set imaging sensitivity, and a signal processing device for processing the image data based on the selected setting values for the various kinds of signal processing.

5. The imaging apparatus according to claim 4, wherein said setting values include parameters designating gradation conversion characteristics for use in a gradation conversion process of the image data, parameters designating a range of correction amounts for use in an edge enhancement process of the image data, and parameters designating a filtering threshold value for use in a noise reduction process of the image data.

6. The imaging apparatus according to claim 1, wherein said imaging sensitivity setting device sets a plural number of imaging sensitivity levels, and said control device sets different exposure values corresponding to the respective imaging sensitivity levels, to make a corresponding number of successive shots at the respective combinations of the imaging sensitivity levels and the exposure values.

7. The imaging apparatus according to claim 6, further comprising a display device for displaying images based on the image data, wherein said control device controls said display device to display an image selection screen that allows selecting at least one of images obtained by the successive shots.

8. The imaging apparatus according to claim 1, wherein said imaging sensitivity setting device sets a first distance range selection parameter for a side of a far end of a moving range of said focusing lens and a second distance range selection parameter for a side of a near end of the moving range of said focusing lens based on the detected zoom position, sets the imaging sensitivity to a first level when the detected in-focus position is on the side of the near end from said second distance range selection parameter, sets the imaging sensitivity to a second level which is higher than the first level when the detected in-focus position is between said first and said second distance range selection parameters, and sets the imaging sensitivity to a third level which is higher than the second level when the detected in-focus position is on the side of the far end from said first distance range selection parameter.

9. An exposure control method for an imaging apparatus comprising a taking lens having a zoom lens and a focusing lens, a solid state imaging device for taking image signal from an optical image of a subject formed through said taking lens, and a flash device for emitting a flashlight to the subject, said method comprising steps of:

measuring a brightness value of the subject;

detecting a zoom position of said zoom lens;

detecting an in-focus position of said focusing lens;

setting an imaging sensitivity based on the detected zoom position and the detected in-focus position;

controlling an exposure value and the volume of the flashlight from said flash device based on the measured subject brightness value and the set imaging sensitivity;

amplifying the imaging signal as being outputted from said solid state imaging device with a gain corresponding to the set imaging sensitivity;

wherein said imaging sensitivity setting step comprises steps of:

selecting at least a distance range selection parameter representative of a threshold object distance, according to the zoom position;

comparing data of the in-focus position with said distance range selection parameter; and setting the imaging sensitivity to a higher level or a lower level depending upon whether an object distance corresponding to the in-focus position is farther than said threshold object distance or not.

* * * * *